United States Patent Office 3,203,929
Patented Aug. 31, 1965

3,203,929
ORGANOBORON COMPOUNDS AND POLYMERS THEREOF
Kiyoshi Kitasaki, Garden Grove, and George W. Willcockson, Anaheim, Calif., assignors to United States Borax & Chemical Corporation, Los Angeles, Calif., a corporation of Nevada
No Drawing. Filed June 20, 1962, Ser. No. 203,722
12 Claims. (Cl. 260—47)

The present invention relates as indicated to a new class of organoboron compounds, and has further reference to polymeric compounds derived from the same.

It is, therefore, the principal object of the present invention to provide as new compositions the 5,5'-bis(2-oxy-1,3,2-benzodioxaboroles).

It is a further object of this invention to provide new thermally stable organoboron polymers derived from these boroles.

It is a still further object of this invention to provide efficient and economically desirable methods for preparing these new monomeric and polymeric compounds.

Other objects of the present invention will appear as the description proceeds.

To the accomplishment of the foregoing and related ends, said inveniton then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises 5,5'-bis(2-oxy-1,3,2-benzodioxaborole) compounds of the formula

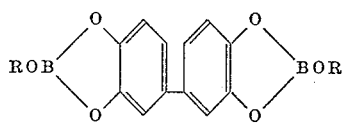

where R is selected from the group consisting of alkyl of from 1 to 8 carbon atoms phenyl, tolyl and hydrogen.

The organoboron compounds of the present invention find a variety of commercial applications. As previously stated, they are of importance as intermediates in the preparation of thermally stable organoboron polymers. These compounds also have utility as herbicides when used alone or in combination with other phytotoxic materials, and they have further utility as bacteriostatic agents which prevent bacterial degradation of hydrocarbon fuels in storage.

The preparation of the present 5,5'-bis(2-oxy-1,3,2-benzodioxaborole) compounds can best be illustrated by the following equations:

(1)
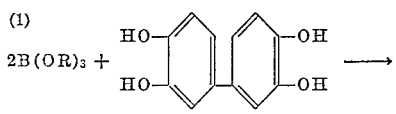

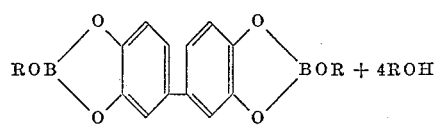

(2)
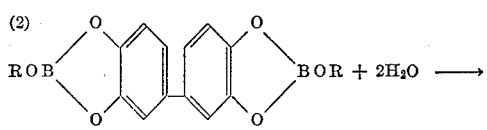

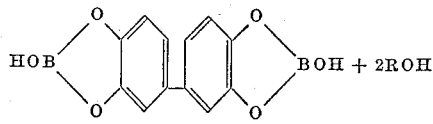

where R is an alkyl of from 1 to 8 carbon atoms, phenyl, or a tolyl radical.

As can be seen from the foregoing equations, the 5,5'-bis(2-oxy-1,3,2-benzodioxaboroles) compounds of the present invention are prepared by the reaction of an orthoborate ester with bis (3,4-dihydroxyphenyl), a known compound, to yield a 5,5'-bis(2-organooxy-1,3,2-benzodioxaborole). The hydroxy compound, 5,5'-bis(2-hydroxy-1,3,2-benzodioxaborole) can readily be prepared by the reaction of the 5,5'-bis(2-organooxy-1,3,2-benzodioxaborole) with water.

The preferred method for preparing the present 5,5'-bis(2-oxy-1,3,2-benzodioxaborole) compounds is to heat a mixture of an applicable orthoborate ester and bis (3,4-dihydroxyphenyl) under reflux in a solvent which is inert to the reactants and continuously remove the alcohol reaction product. The resultant reaction mass is then allowed to cool and 5,5'-bis(2-organooxy-1,3,2-benzoidoxaboroles) can be recovered therefrom, or water can be added to this reaction mass and 5,5'-bis(2-hydroxy-1,3,2-benzodioxaborole) is recovered from the resultant reaction mass.

Bis(3,4-dihydroxyphenyl) can be prepared by the reaction of 3,4-dimethoxyiodobenzene with the copper powder and carbon dioxide to give the corresponding bis(3,4-dimethoxyphenyl) which is hydrolyzed with HI according to the procedure of E. Späth and K. Gibian, Monatsh. 53, 347 (1930); Chem. Abstracts 24, 4018 (1930).

As regards the orthoborate esters applicable to the present invention, these compounds have the formula $B(OR)_3$ where R is either an alkyl of from 1 to 8 carbon atoms, phenyl, or a tolyl radical. The following list is illustrative of these orthoborate esters:

Trimethyl borate
Triethyl borate
Tri-n-propyl borate
Triisopropyl borate
Tri-n-butyl borate
Tri-t-butyl borate
Triisoamyl borate
Tri-n-hexyl borate
Tri-n-octyl borate
Triphenyl borate
Tri-n-cresyl borate
Tri-p-cresyl borate The solvents applicable to the present invention must be inert to the reactants and to the desired products. The common armoatic hydrocarbon solvents, ethers, alkoxy and chloro-substituted aromatic hydrocarbons, and N,N-substituted organic amides are all suitable for this purpose. The following list is illustrative of these compounds:

Benzene
Toluene
Xylene
Monochlorobenzene
Dichlorobenzene
Anisole
Veratrole
N,N-dimethylacetamide
Dibutyl ether
Diphenyl ether
Diethyleneglycol dimethyl ether (diglyme)
Tetraethyleneglycol dimethyl ether (tetraglyme)

It is to be clearly understood that the foregoing lists of compounds are only a partial enumeration of the orthoborate esters and solvents applicable to the present invention.

So that the present invention can be more clearly understood, the following examples are given for illustrative purposes:

I. Bis(3,4-dihydroxyphenyl), 4.36 grams (0.02 mole) was suspended in 100 ml. of toluene and heated to 100° C. The suspension was allowed to cool, and 7.52 grams (0.04 mole) of triisopropyl borate in 20 ml. of toluene was added. The reaction mixture was then heated under reflux for about 6 hours, at which time 4.12 grams (94%) of isopropanol had been removed in the form of an isopropanol-toluene azeotrope. The resultant reaction mass was then allowed to cool and the toluene was removed by distillation at reduced pressure to yield 6.53 grams (92.3% yield) of 5,5'-bis(2-isopropoxy-1,3,2-benzodioxaborole). The chemical analysis of the product yielded the following data.

Calculated for $C_{18}H_{20}B_2O_6$: C=61.08%, B=6.11%, H=5.70%. Found in product: C=60.63%, B=6.07%, H=5.75%.

II. A solution of 9.2 grams (0.04 mole) of tri-n-butyl borate in 10 ml. of veratrole was added to a stirred solution of 4.36 grams (0.02 mole) of bis(3,4-dihydroxyphenyl) in 100 ml. of veratrole. The solution was heated under reflux for about 2 hours, at which time 5.88 grams (97.8%) of n-butanol had been removed. The resultant reaction mass was allowed to cool and the veratrole was removed by distillation at reduced pressure to yield 7.23 grams (94.6% yield) of 5,5'-bis(2-n-butoxy-1,3,2-benzodioxaborole). The chemical analysis of the product yielded the following data.

Calculated for $C_{20}H_{24}B_2O_6$: C=62.88%, B=5.66%, H=6.33%. Found in product: C=62.03%, B=5.69%, H=6.43%.

III. A mixture of 8.70 grams (0.03 mole) of triphenyl borate in 15 ml. of tetraglyme was added to a stirred solution of 3.27 grams (0.015 mole) of bis(3,4-dihydroxyphenyl) in 100 ml. of tetraglyme. The reaction mixture was heated under reflux for about 5 hours, at which time 5.45 grams (96.5%) of phenol had been removed. The resultant reaction mass was allowed to cool and the tetraglyme was removed by distillation at reduced pressure to yield 5.93 grams (93.7%) of 5,5'-bis(2-phenoxy-1,3,2-benzodioxaborole). Chemical analysis of the product yielded the following data.

Calculated for $C_{24}H_{16}B_2O_6$: C=68.30%, B=5.13%, H=3.82%. Found in product: C=67.71%, B=5.17%, H=4.00%.

IV. A mixture of 8.76 grams (0.06 mole) of triethyl borate in 20 ml. of diglyme was added to a stirred solution of 6.55 grams (0.03 mole) of bis(3,4-dihydroxyphenyl) in 120 ml. of diglyme. The reaction mixture was heated under reflux for about 4 hours at which time 5.38 grams (97.3%) of ethanol had been removed. The resultant reaction mass was allowed to cool, and the diglyme was removed by distillation at reduced pressure to yield 9.30 grams (95.2% yield) of 5,5'-bis(2-ethoxy-1,3,2-benzodioxaborole). Chemical analysis of the product yielded the following data.

Calculated for $C_{16}H_{16}B_2O_6$: C=58.96%, B=6.64%, H=4.95%. Found in product: C=58.42%, B=6.65%, H=5.01%.

V. Water, 0.72 gram (0.04 mole) was added to a solution of 6.52 grams (0.02 mole) of 5,5'-bis(2-ethoxy-1,3,2-benzodioxaborole) in 120 ml. of veratrole. The mixture was then cooled and filtered to yield 5.01 grams (92.7% yield) of 5,5'-bis(2-hydroxy-1,3,2-benzodioxaborole). Chemical analysis of the product yielded the following data.

Calculated for $C_{12}H_8B_2O_6$: C=53.41%, B=8.02%, H=2.99%. Found in product: C=52.65%, B=7.97%, H=2.85%.

VI. A solution of 7.52 grams (0.04 mole) of triisopropyl borate in 10 ml. of veratrole was added to a solution of 4.36 grams (0.02 mole) of bis(3,4-dihydroxyphenyl) in 100 ml. of veratrole. The reaction mixture was stirred and heated under reflux for about 5 hours at which time 4.63 grams (96.3%) of isopropanol had been removed. The resultant reaction mass was allowed to cool to below about 70° C., and 0.9 gram (0.05 mole) of water was added. Benzene was then added to the reaction mixture and the resultant precipitate was removed by filtration to yield 4.82 grams (89.2%) of 5,5'-bis(2-hydroxy-1,3,2-benzodioxaborole). Chemical analysis of the product yielded the following data.

Calculated for $C_{12}H_8B_2O_6$: C=53.41%; B=8.02%; H=2.99%. Found in product: C=52.50%; B=7.74%; H=3.05%.

The present 5,5'-bis(2-hydroxy-1,3,2-benzodioxaborole) will readily undergo polymerization to produce thermally stable polymers. For example, by heating 5,5'-bis(2-hydroxy-1,3,2-benzodioxaborole) in the presence of one of the aforementioned solvents and continuously removing the water evolved during the polymerization reaction a polymer is formed which has the following recurring structural unit

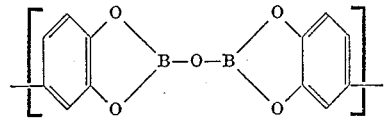

The following examples are illustrative of the methods for preparing these polymers:

I. To 100 ml. of diglyme was added 5.12 grams (0.019 mole) of 5,5'-bis(2-hydroxy-1,3,2-benzodioxaborole). The reaction mixture was then heated to reflux and kept there for a short period of time, and the water of reaction was continuously removed by distillation. After the water evolution had substantially ceased, the diglyme was removed by distillation at reduced pressure and 3.75 grams, 78.5% yield, of a white, powdery polymeric resin, M.P. 420°–457° C., was recovered from the reaction vessel. Chemical analysis of the product yielded the following data.

Caluculated for $C_{12}H_6B_2O_5$: C=57.23%; B=8.59%; H=2.40%. Found in product: C=56.48%; B=8.23%; H=2.65%.

II. A solution of 7.52 grams (0.04 mole) of triisopropyl borate in 10 ml. of veratrole was added to a solution of 4.36 grams (0.02 mole) of bis(3,4-dihydroxyphenyl) in 100 ml. of veratrole. The reaction mixture was stirred and heated under reflux for about 5.5 hours at which time the theoretical amount of isopropyl alcohol, 4.80 grms (0.08 mole), had been removed. The reaction mass was then cooled to below about 70° C. and 0.9 gram (0.05 mole) of water was added. The resultant solution was then slowly heated and isopropyl alcohol began to distill from the solution at about 85° C., and on reaching about 205° C. substantially all of the isopropyl alcohol and water of reaction had been removed. The veratrole was then removed by distillation at reduced pressure and 3.50 grams, 70% yield, of a white, powdery polymeric resin, M.P. 438°–472° C., was recovered from the reaction vessel. Chemical analysis of the product yielded the following data.

Calculated for $C_{12}H_6B_2O_5$: C=57.23%; B=8.59%; H=2.40%. Found in product: C=56.25%; B=8.14%; H=2.61%.

The polymers of the present invention were subjected to thermogravimetric analysis to determine their thermal stability. The polymeric materials were heated at a constant temperature increase of 150° C. per hour at a pressure of about $10^{-4}$ mm. Hg. The recorded weight losses for these materials at 500° C. were in the range of from about 4 to about 6 percent.

As can be seen, the present polymers are thermally stable at temperatures of at least 500° C., and they have a variety of industrial applications. These materials have excellent adhesive properties and have utility in the bonding of such materials as glass, wood and metal, and in the preparation of fiberglass laminates.

Other modes of applying the principle of the invention may be employed, change being made as regards the details described, provided the features stated in any of the following claims or the equivalent of such be employed.

We, therefore, particularly point out and distinctly claim as our invention:

1. 5,5'-bis(2-oxy-1,3,2-benzodioxaborole) compounds having the formula

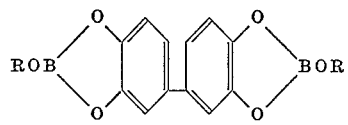

where R is selected from the group consisting of hydrogen, alkyls of from 1 to 8 carbon atoms, phenyl and tolyl.

2. 5,5'-bis(2-isopropoxy-1,3,2-benzodioxaborole).
3. 5,5'-bis(2-*n*-butoxy-1,3,2-benzodioxaborole).
4. 5,5'-bis(2-phenoxy-1,3,2-benzodioxaborole).
5. 5,5'-bis(2-ethoxy-1,3,2-benzodioxaborole).
6. 5,5'-bis(2-hydroxy-1,3,2-benzodioxaborole).
7. The method for preparing 5,5'-bis(2-oxy-1,3,2-benzodioxaborole) compounds which comprises heating under reflux a mixture of an orthoborate ester, of the formula $B(OR)_3$ and bis(3,4-dihydroxyphenyl) in the presence of a solvent inert to the reactants, continuously removing the alcohol reaction by-product, and recovering a 5,5'-bis(2-organooxy-1,3,2-benzodioxaborole) from said reaction mass, where R is selected from the group consisting of alkyl of from 1 to 8 carbon atoms, phenyl and tolyl.

8. The method for preparing 5,5'-bis(2-oxy-1,3,2-benzodioxaborole) compounds which comprises heating under reflux a mixture of an orthoborate ester, of the formula $B(OR)_3$ and bis(3,4-dihydroxyphenyl) in the presence of a solvent inert to the reactants, continuously removing the alcohol reaction by-product, allowing the resultant reaction mass to cool, adding water to said reaction mass, and recovering 5,5'-bis(2-hydroxy-1,3,2-benzodioxaborole) from the resultant reaction mass, where R is selected from the group consisting of alkyl of from 1 to 8 carbon atoms, phenyl, and tolyl.

9. The method for preparing 5,5'-bis(2-hydroxy-1,3,2-benzodioxaborole) which comprises adding water to a 5,5'-bis(2-organooxy-1,3,2-benzodioxaborole) in the presence of a solvent inert to said borole, and recovering said 5,5'-bis(2-hydroxy-1,3,2-benzodioxaborole) from the resultant reaction mass.

10. The method for preparing organoboron polymers consisting essentially of the recurring structural unit

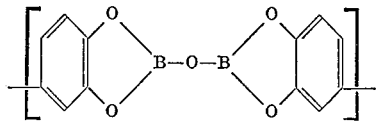

which comprises heating under reflux 5,5'-bis(2-hydroxy-1,3,2-benzodioxaborole) in a solvent inert to said reactant, continuously removing the water of reaction and recovering said organoboron polymer from the resultant reaction mass.

11. The method for preparing organoboron polymers consisting essentially of the recurring structural unit

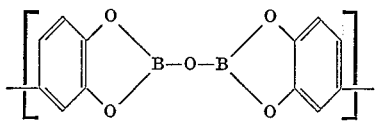

which comprises heating under reflux a mixture of an orthoborate ester of the formula $B(OR)_3$ and bis(3,4-dihydrophenyl) in the presence of a solvent inert to the reactants, continuously removing the alcohol reaction by-product, allowing the resultant reaction mass to cool, adding water to said reaction mass, heating the resultant reaction mixture under reflux, continuously removing the alcohol and water reaction by-products, and recovering said organoboron polymer from the resultant reaction mass, where R is selected from the group consisting of alkyl of from 1 to 8 carbon carbon atoms, phenyl and tolyl.

12. Organoboron polymers consisting essentially of the recurring structural unit

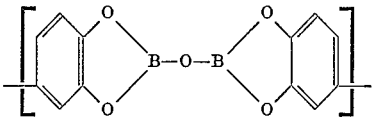

References Cited by the Examiner

Gerrard et al.: Chemical Society Journal (London), 1529–1535, April 1959.

Gerrard: The Organic Chemistry of Boron, pages 35–36 and 194, Academic Press, 1961.

WILLIAM H. SHORT, *Primary Examiner.*